United States Patent Office 3,295,841
Patented Jan. 3, 1967

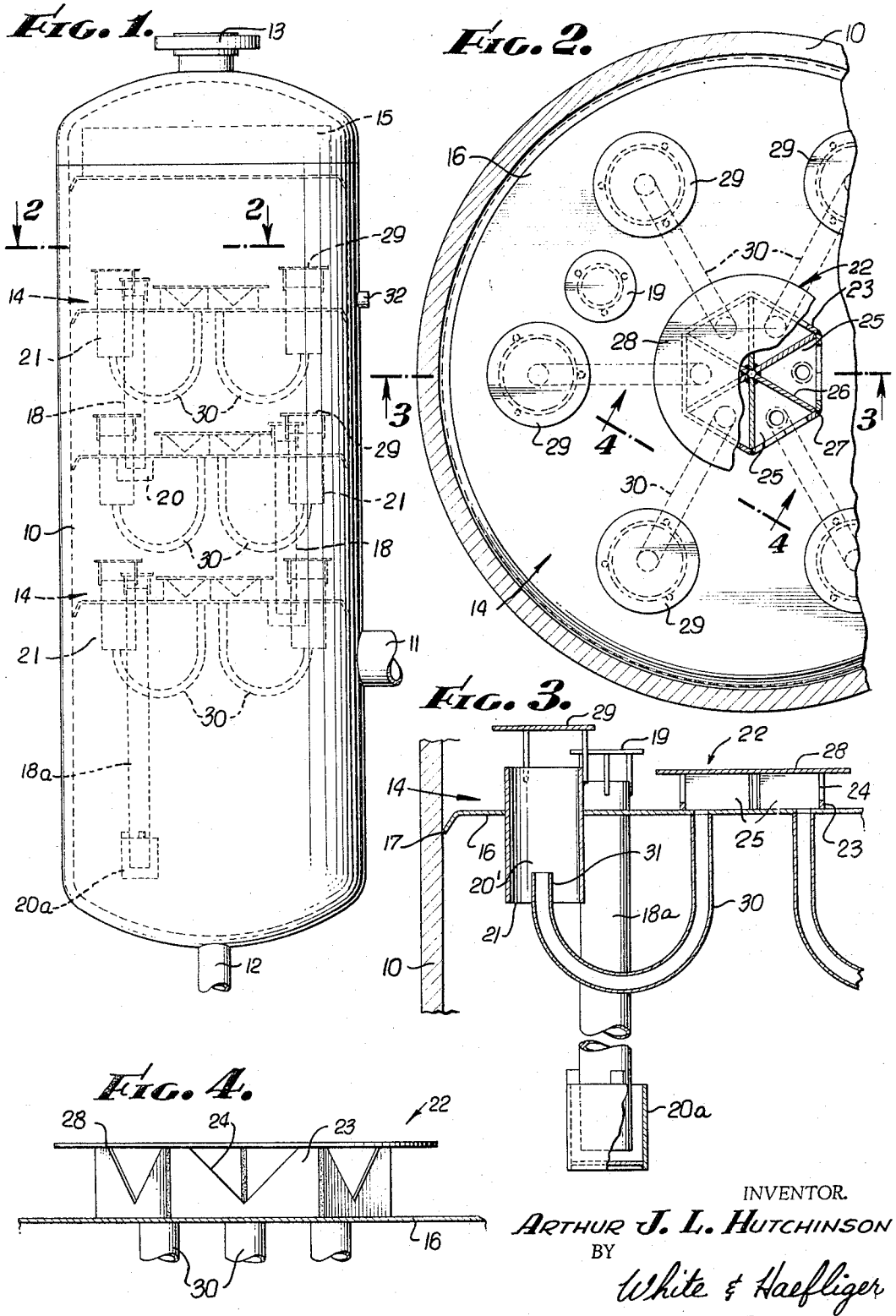

3,295,841
LIQUID-VAPOR CONTACT METHOD AND APPARATUS
Arthur J. L. Hutchinson, Palm Springs, Calif., assignor of one-half to William L. Rifenberick, Glendale, Calif.
Filed Feb. 19, 1963, Ser. No. 259,654
3 Claims. (Cl. 261—114)

This invention has to do generally with improved methods and apparatus for effecting vapor-liquid contact to serve any of such purposes as gas or vapor absorption, distillation, dehydration, rectification and the like, by the use of one or more contact trays over which a liquid phase is passed for intimate contact and admixture with a vapor or gas phase.

The invention is more particularly concerned with improvements in methods and apparatus pertaining to a mode of tray operation exemplified in some respects by my prior Patents Nos. 2,804,935 and 2,804,941, according to which provision is made for metering a predeterminable portion of a total tray liquid, the remainder of which goes to collection or to a tray below, and introducing the metered liquid portion into the gas or vapor rising through the tray, all in a manner whereby the ratio of contacting or metered liquid to the gas or vapor, is independently controllable in keeping with the requirements of particular tray usages. Thus where desirable, it is possible to maintain on a given tray, or tray series, very high liquid to gas or vapor contact ratios, well beyond those attainable with conventional bubble cap or perforated trays.

More specifically, the invention is directed to novel performance and structural characteristics given a type of recirculation tray wherein a predeterminable portion of the tray liquid is metered and delivered into a vapor neck or riser wherein the vapor velocity entrains the liquid and carries it into a separation space above the tray, a recirculation effect occuring by reason of return to the tray liquid of liquid particles collecting from the vapor space. To the extent indicated, this general type of recirculation occurs according to my above mentioned prior patents, but according to the embodiments therein shown, specifically by liquid introduction to the vapor stream at a location above the tray proper.

The present invention has for its major object, provision for effecting greater intimacy and time of contact between the metered liquid and vapor, to the end of greater approach during each liquid recycle, to equilibrium between the liquid and vapor phases corresponding to the tray operating conditions otherwise. As will appear, the combined effects of liquid recycle and intimacy and extension of liquid-vapor contact permits close approach to the equilibruim ideal, a benefit of importance as for some dehydrating purposes where it is most economical or otherwise desirable to maintain the lowest possible over-all liquid-gas ratio.

In furtherance of this object, the invention contemplates departure from prior practices of which I am aware, by conducting a metered portion of the total tray liquid downwardly beneath the tray and introducing the liquid into a vapor riser passage which is vertically extended by reason of its dependency below the tray and its termination at an elevation above the liquid level on the tray. Preferably, by axial delivery of the liquid into the vapor passage, I establish a condition conducive to liquid break-up and small particle entrainment in the gas stream, and as indicated, extension of the period of liquid-gas contact in keeping with the extension given the entraining vapor passage.

This relation permits of plural recycle systems in a single tray since by a novel structural metering or weir arrangement, a portion of the total tray liquid may be divided into separate metered streams each of which may be delivered down through the tray into separate vapor riser passages.

The manner of accomplishment of these and other objects of the invention will be more fully understood from the following detailed description of a typical and illustrative embodiment shown by the accompanying drawing in which:

FIG. 1 is a view showing a typical contactor in elevation, the tray series appearing in dotted lines;
FIG. 2 is an enlarged fragmentary plan section taken on line 2—2 of FIG. 1;
FIG. 3 is a fragmentary section taken on line 3—3 of FIG. 2; and
FIG. 4 is an elevation of the weir assembly as viewed from line 4—4 in FIG. 2.

The contactor is shown to comprise a shell 10 having a gas or vapor inlet 11, a bottom liquid outlet 12 and a top gas or vapor outlet 13. As will be understood, particular shell configurations, inlet and outlet locations and the number of tray assemblies, are subject to variation in accordance with particular purposes for which the equipment may be used. Merely as illustrative, the contactor is shown to contain three tray assemblies, generally indicated at 14, and a diagrammatically indicated entrainment or mist separator 15 which may be of any suitable design.

Each tray assembly 14 includes a tray plate or floor 16 secured to the shell 10 as by welding at 17, the upper trays containing liquid overflow pipes 18 the upper ends of which carry baffles 19 and project above the tray proper a distance that predetermines the liquid level on the tray. The lower ends of the overflow pipes 18 extend downwardly into liquid seal cups 20 mounted to and opening upwardly through the trays. The lowermost overflow pipe 18a terminates in a seal cup 20a within the bottom liquid chamber of the shell.

Each tray accommodates a plurality, typically six, systems for metering as many streams from the total tray liquid, and acting to deliver the metered streams into a corresponding number of vapor riser passages 20′ formed by open end tubes 21. As shown in FIG. 3 tubes rise from a substantial distance below the tray, upwardly therethrough to an elevation somewhat above overflow pipes 18, and therefore above the liquid level on the tray. The central area of the tray accommodates a weir assembly, generally indicated at 22, shown to comprise a hexagonal arrangement of individual plates 23 having metering openings formed typically by V-cuts or notches 24 terminating above the tray plate to form weirs which meter portions of the tray liquid which overflow into spaces 25 at the insides of the weirs. These spaces are defined by the weir plates 23 and partitions 26 terminally welded to the plate junctures at 27, as clearly illustrated in FIG. 2. FIG. 3 illustrates the application of baffles 29 in spaced overlying relation with the vaporizer tubes 21.

Liquid metered into the spaces 25 drains into tubes 30 extending downwardly below the tray and terminating at 31 centrally within the inlet ends of the vaporizer tubes 21 as shown in FIG. 3. By reason of this arrangement, the liquid capacity flow through tubes 30 into the centers of the vapor streams normally rising at substantial velocity, produces effective liquid-vapor contact and admixture by reason of the capacity of the vapors to divide the liquid and entrain it in greatly reduced particle form, all of which is conducive to promotion of an equilibrium relation between the liquid and vapor phases because of their intimacy of contact and large exposed surface area of the liquid phase. Unvaporized liquid particles projected from the passages 20′, separate from the vapors in the space above the tray and drop into the tray liquid, thus completing the recycle.

Liquid delivery to the top tray may occur through an inlet 32, or otherwise, and the trays become liquid flooded to depths generally predetermined by the overflow pipes 18. That portion of the total tray liquid taken for delivery into the vapor streams may be predetermined by the effective heights of the weir openings 24, so that as greater proportionate flow occurs over the weirs, the greater becomes the proportion of tray liquid recirculation through tubes 30 into the vapor streams. Thus, as previously indicated, in this manner it becomes possible where desired to maintain very high over-all liquid-to-vapor contact ratios on each tray, a feature of importance where it is desirable to achieve maximum equilibrium relations between the liquid and vapor compositions at each tray.

As an example, where a liquid has high absorption or dissolution capacity for a given gas or vapor, that capacity may be achieved by providing for high recirculation rates (proportionate to the total tray liquid) through tube 30 into the gas or vapor streams, while realizing the practical advantage of minimized initial equipment costs, e.g. contactor size and required trays, as well as minimized operating costs. As will be apparent, the same applies where for any given purpose the lowest practicable liquid to gas or vapor ratios are desirable for depleting the liquid with respect to one or more components subject to removal by stripping into the gas or vapor phase.

I claim:
1. Liquid gas contacting apparatus comprising,
 (A) a shell containing a horizontal circular tray,
 (B) means for maintaining a substantially constant level of liquid on the tray and for passing a portion thereof downwardly through the tray,
 (C) means forming a plurality of circularly arranged open vapor riser passages spaced radially from the center of the tray,
 (D) means at a central area of the plate for continuously metering a second portion of said liquid body into separate streams corresponding in number to said vapor riser passages, said metering means comprising circularly arranged weirs in the central area of the tray for individually metering separate streams of the liquid from the central tray area, and
 (E) means for conducting said separate streams downwardly through the tray into the centers of said passages for entrainment of the liquid in vapors flowing upwardly through the passages and return of the liquid to said liquid body, said conducting means including pipes extending downwardly from the downstream sides of said weirs and then upwardly into said passages.

2. Apparatus according to claim 1, in which said vapor riser passages comprise open end cylindrical tubes extending above the level of said liquid body.

3. The method of contacting large volumes of a gas with relatively small volumes of liquid down flow in a plate column wherein a body of said liquid is maintained and recirculated on a contactor tray, said method including the steps of:
 conducting vapors upwardly through a plurality of open circularly arranged cylindrical passages radially offset from a central area of the tray, said passages each having an inlet below the tray and extending upwardly therethrough,
 constantly passing a relatively minor portion of said body of liquid downwardly through the tray,
 removing a relatively large portion of said body of liquid from above a uniform depth of the liquid about the center of the tray and continuously metering the removed liquid into separate streams flowing into the central area of the tray, said separate streams corresponding in number to said passages, and the metered quantity of each stream being in excess of the minor portion of liquid which is passing downwardly through the tray, and
 subjecting the metered streams of liquid to continuous recirculation by conducting said streams from said central area and radially of the tray respectively and introducing into the open centers of said passages below the tray for cyclic flow by being entrained in a divided state in the vapors flowing upwardly through said passages and tray and then being returned to said body of liquid.

References Cited by the Examiner
UNITED STATES PATENTS

| | | | |
|---|---|---|---|
| 1,741,519 | 12/1929 | Huff | 261—114 |
| 2,149,362 | 3/1939 | Riegler | 261—114 X |
| 2,665,975 | 1/1954 | Ng | 23—270.5 |
| 2,804,935 | 9/1957 | Hutchinson | 261—114 X |

HARRY B. THORNTON, *Primary Examiner.*

E. H. RENNER, *Assistant Examiner.*